United States Patent [19]

Schiller et al.

[11] 4,147,855

[45] Apr. 3, 1979

[54] ORGANOPOLYSILOXANE COMPOSITIONS AND ELASTOMERS OBTAINED THEREFROM

[75] Inventors: August Schiller, Marktl; Norman Dorsch, Fuchshausen; Owsin Sommer, Burghausen, all of Fed. Rep. of Germany

[73] Assignee: Wacker-Chemie GmbH, Munich, Fed. Rep. of Germany

[21] Appl. No.: 846,281

[22] Filed: Oct. 28, 1977

[30] Foreign Application Priority Data

Nov. 25, 1976 [DE] Fed. Rep. of Germany ....... 2653499

[51] Int. Cl.$^2$ ............................................. C08G 77/04
[52] U.S. Cl. ..................................... 528/23; 260/18 S; 260/37 SB; 260/45.7 P; 260/45.95 L; 528/34; 528/38; 528/901
[58] Field of Search ................... 260/45.7 P, 45.95 L, 260/46.5 G; 528/23, 34, 38, 901

[56] References Cited

U.S. PATENT DOCUMENTS 3,677,996  7/1972  Kaiser et al. .................. 260/46.5 G Primary Examiner—Melvyn I. Marquis

[57] ABSTRACT

This invention relates to compositions which can be stored under anhydrous conditions, but when exposed to atmospheric moisture cure at room temperature to form elastomers. These compositions contain a diorganopolysiloxane having terminal condensable groups, a silicon compound having at least one nitrogen atom and at least three hydrolyzable groups per molecule, a reinforcing filler and a phosphoric acid ester. These compositions have improved stability and improved flow properties. Elastomers prepared from these compositions when compared with known compositions, have lower mudulus values at 100 percent elongation.

6 Claims, No Drawings

ORGANOPOLYSILOXANE COMPOSITIONS AND ELASTOMERS OBTAINED THEREFROM

BACKGROUND OF THE INVENTION

The invention relates to room temperature curable organopolysiloxane compositions and more particularily to elastomers prepared therefrom.

Compositions which can be stored under anhydrous conditions, but when exposed to atmospheric moisture cure to an elastomer at room temperature are well known in the art. U.S. Pat. No. 3,677,996 to Kaiser et al discloses, for example a composition containing a diorganopolysiloxane having terminal condensable groups, a silicon compound having at least one nitrogen atom and at least three hydrolyzable groups per molecule and a reinforcing filler which cures to an elastomeric solid when exposed to atmospheric moisture at room temperature.

When the compositions known heretofore are compared with the compositions of this invention, it was found that the compositions of this invention cure faster than the conventional compositions. Moreover, the compositions of this invention have better flow properties and can therefore be inserted into narrow apertures at a faster rate. Also the compositions of this invention exhibit improved stability. Furthermore, elastomers prepared from these compositions have a lower modulus value at 100 percent elongation even though they contain the same amount of filler as used in the room temperature curable compositions known heretofore.

Therefore, it is an object of this invention to provide a room temperature curable organopolysiloxane composition having improved stability. Another object of this invention is to provide a room temperature curable composition having improved flow properties. A further object of this invention is to provide elastomers having improved modulus at 100 percent elongation.

SUMMARY OF INVENTION

The foregoing objects and others which will become apparent from the following description are accomplished in accordance with this invention, generally speaking, by providing organopolysiloxane compositions which can be stored at room temperature under anhydrous conditions, but when exposed to atmospheric moisture cure to elastomers at room temperature comprising a diorganopolysiloxane containing reactive terminal groups, a silicon compound having at least one nitrogen atom and at least three hydrolyzable groups per molecule, a reinforcing filler and a phosphoric acid ester.

DETAILED DESCRIPTION OF THE INVENTION

The compositions of this invention can be prepared from the same diorganopolysiloxanes having reactive terminal groups which have been or could have been used heretofore in the preparation of compositions which can be stored under anhydrous conditions but which cure to form elastomers which exposed to atmospheric moisture at room temperature containing diorganopolysiloxanes having reactive terminal groups and a silicon compound which has at least one nitrogen atom and at least three hydrolyzable groups per molecule. The diorganopolysiloxanes containing condensable terminal groups which are generally used in the preparation of such compositions and which are preferred in this invention, are represented by the general formula:

$$HO(SiY_2O)_xSiY_2OH$$

wherein Y which is the same or different represents monovalent, substituted monovalent and/or polymeric hydrocarbon radicals and x is a number having a value of at least 10.

Although this is generally not indicated in formulas such as illustrated above, siloxane units other than the diorganosiloxane units ($SiY_2O$) may be present along the siloxane chains illustrated in the above formula. Examples of such other siloxane units which are present generally as impurities are those corresponding to the formulas: $YSiO_{3/2}$, $Y_3SiO_{\frac{1}{2}}$ and $SiO_{4/2}$, where Y is the same as above. It is preferred that siloxane units other than the diorganosiloxane units be less than about 10 mol percent and more preferably be less than about 1 mol percent. If desired, the hydroxyl groups shown in the above formula can be entirely or partially substituted with condensable groups other than Si-bonded hydroxyl groups. Examples of other condensable groups are amino groups which are bonded to silicon via nitrogen, oxime groups which are bonded to silicon via oxygen, alkoxy groups having from one to five carbon atoms and alkoxyalkyleneoxy groups having from one to five carbon atoms, such as a radical of the formula: $CH_3OCH_2CH_2O—$.

Examples of hydrocarbon radicals represented by Y are alkyl radicals, such as the methyl, ethyl, n-propyl, butyl, as well as octadecyl radicals; alkenyl radicals, such as the vinyl, allyl and the oleyl radicals; cycloaliphatic hydrocarbon radicals, such as the cyclopentyl and cyclohexyl radicals, as well as methylcyclohexyl and cyclohexenyl radicals, aryl radicals, such as the phenyl and xenyl radicals; aralkyl radicals, such as the benzyl, the beta-phenylethyl and the beta-phenylpropyl radicals, and alkaryl radicals, such as the tolyl radicals.

Preferred examples of substituted hydrocarbon radicals represented by Y are haloaryl radicals, such as chlorophenyl and bromophenyl radicals; perfluoroalkylethyl radicals, such as the perfluoromethyl radical and cyanoalkyl radicals, such as the beta-cyanoethyl radical.

Examples of substituted and unsubstituted polymeric hydrocarbon radicals (also referred to as "modified" hydrocarbon radicals) are those which are formed in the polymerization of polymerizable compounds in the presence of free radicals and diorganopolysiloxanes. The resultant composition often referred to as "modified" organopolysiloxanes, may be represented by the general formula:

$$R(SiY_2'O)_x SiY_2'R,$$

in which x is the same as above and Y' which is the same or different represents monovalent and substituted monovalent hydrocarbon radicals and R represents hydrogen or is the same as Y'. Examples of polymerizable compounds which may be used to form modified organopolysiloxanes are vinyl acetate and/or ethylene, styrene and/or acrylic and/or methacrylic acid, acrylic and/or methacrylic acid esters and/or methacrylonitrile.

Because of their availability, it is preferred that at least 50 percent of the Y radicals be methyl radicals.

The diorganopolysiloxanes which have condensable terminal groups can be homopolymers or copolymers. Mixtures of various diorganopolysiloxanes can also be employed.

It is preferred that the diorganopolysiloxanes which have condensable terminal groups have a viscosity of from 100 to 500,000 mPa s at 25° C.

The compositions of this invention can be prepared from the same silicon compounds which have been used heretofore in the preparation of compositions which can be stored under anhydrous conditions, but which crosslink to form elastomers when exposed to water at room temperature. These compositions are prepared from a diorganopolysiloxane having reactive terminal groups and a silicon compound which contains at least one nitrogen atom and at least three hydrolyzable groups per molecule.

Examples of silicon compounds having at least one nitrogen atom and at least three hydrolyzable groups which can be used to prepare the curable compositions of this invention are aminosilanes having the general formula:

$$Y'_b Si(NH_a R^1_{2-a})_{4-b},$$

in which Y' is the same as above, $R^1$ represents a monovalent or substituted monovalent hydrocarbon radical; a is 0, 1 or 2 and b is 0 or 1, and partial hydrolyzates thereof having a maximum of 10 silicon atoms per molecule.

Except for the vinyl radicals, the previously cited examples of substituted and unsubstituted hydrocarbon radicals represented by Y are equally applicable to substituted and unsubstituted hydrocarbon radicals represented by $R^1$. Other examples of hydrocarbon radicals represented by $R^1$ are the n-butyl, sec-butyl and the tert-butyl radicals. The preferred radicals are the sec-butyl and the cyclohexyl radical.

Additional examples of silicon compounds which can be used to prepare curable compositions of this invention and which contain at least one nitrogen atom and at least three hydrolyzable groups per molecule, are oximo silanes having the general formula:

$$Y_b' Si(ON=X)_{4-b},$$

where Y' and b are the same as above and X represents an $RR^1C=$ group where R and $R^1$ are the same as above or an $R^2C=$ group where $R^2$ represents a bivalent, or a substituted bivalent hydrocarbon radical and partial hydrolysates thereof having a maximum of 10 silicon atoms per molecule, as well as silanes having the general formula:

$$Y_b' Si(ON=X)_c(NH_a R^1_{2-a})_{4-b-c},$$

where $R^1$, X, Y', a and b are the same as above and c has an average value of at least 0.5 but does not exceed 2.9.

Still other examples of silicon compounds which can be used to prepare the compositions of this invention and which contain at least one nitrogen atom and at least three hydrolyzable groups per molecule, are aminoxysilanes having the general formula:

$$Y_b' Si(ONH_a R^1_{2-a})_{4-b},$$

in which $R^1$, Y', a and b are the same as above and silanes of the following formula:

$$Y_b' Si(NRCOR)_d(OR^3)_{4-b-d},$$

where R, Y' and b are the same as above, $R^3$ represents an alkyl radical and d is 1, 2 or 3. Other silanes which may be employed are silanes having the formulas:

$$Y_b' Si(NCO)_{4-b}$$

and $$Y_b' Si(NCS)_{4-b},$$

where Y' and b are the same as above. Silanes, such as those having the general formula:

$$R_3^4 SiE,$$

where $R^4$ is an alkoxy group and/or hydrogen and E represents an amino group, a substituted amino group or a monovalent hydrocarbon radical which contains at least one amino group or substituted amino group which is bonded to the silicon atom via carbon or nitrogen, or partial hydrolysates thereof having a maximum of 10 silicon atoms per molecule may be employed in the curable compositions of this invention. Also silanes having the general formula:

$$R_e^5 Si Z_{4-e},$$

wherein $R^5$ is an alkoxy group and/or a hydrogen atom and/or is the same as Y', Z represents a monovalent hydrocarbon radical which is bonded to the silicon atom via an oxygen atom and which contains at least one amino group or a substituted amino group, and e is 0, 1, 2 or 3, providing that e may not be more than 1 when $R^5$ has the same meaning as Y', and partial hydrolysates thereof which contain a maximum of 10 silicon atoms per molecule may be used as cross-linking agents in the compositions of this invention.

It can readily be seen from the above examples of silicon compounds which contain at least one nitrogen atom and at least three hydrolyzable groups per molecule, that it is not essential for the nitrogen to be present in the hydrolyzable groups, nor is it essential that the nitrogen always be bonded directly to the silicon atom in order to be a desirable crosslinking agent.

Suitable examples of silicon compounds which may be used as crosslinking agents and which contain at least one nitrogen atom and at least three hydrolyzable groups per molecule are methyltris-(n-butylamino)-silane, methyltris-(sec-butylamino)-silane, methyltris-(cyclohexylamino)-silane, methyltris-(methylethylketoximo)-silane, methyl-bis-(methylethylketoximo)-cyclohexylaminosilane, methyltris-(acetonoximo)-silane, methyltris-(benzoylmethylamino)-silane, methyltris-(diethylaminoxy)-silane, methyltriisocyanatosilane, N-aminoethylaminopropyltriethoxysilane and (aminobutoxy)-triisopropoxysilane.

Mixtures consisting of various silicon compounds which have at least one nitrogen atom and at least three hydrolyzable groups per molecule, such as for example, a mixture containing 1 mol of methyltris-(cyclohexylamino)-silane and 2 mols of methyltris-(methylethylketoximo)-silane may be employed as crosslinking agents.

Silicon compounds which contain at least one nitrogen atom and at least three hydrolyzable groups per molecule are preferably used in such an amount that there is at least 1 gram equivalent of a hydrolyzable group present for each gram equivalent of terminal condensable groups present in the diorganopolysiloxanes. Generally the silicon compounds, which contain at least one nitrogen atom and at least three hydrolyzable groups per molecule, are employed in an amount of from 0.2 to about 15 percent by weight and more preferably from 1 to 8 percent by weight based on the total weight of the composition. Reinforcing fillers, i.e., fillers having a surface area of at least 50 m²/gm, which have been or could have been used heretofore in the preparation of organopolysiloxane elastomers can be used in the compositions of this invention. Examples of suitable fillers are pyrogenically produced silicon dioxide, silicic acid hydrogels which have been dehydrated while maintaining their structure and other types of precipitated silicon dioxide having a surface area of at least 50 m²/gm. Other fillers having a surface area of at least 50 m²/gm may be used either alone or in combination with the silicon dioxide type of fillers described above. Examples of other fillers which have a surface area of at least 50 m²/gm are metal oxides such as titanium dioxide, ferrous oxide, aluminum oxide and zinc oxide.

The reinforcing fillers are preferably used in amounts of from 1 to 15 percent by weight based on the total weight of all organosilicon compounds present in the composition.

Examples of phosphoric acid esters which may be used in the compositions of this invention are those represented by the following general formula:

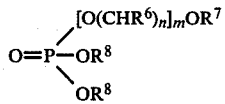

in which $R^6$ represents hydrogen or an alkyl radical, $R^7$ represents hydrogen or an alkyl, alkenyl, cycloalkyl, aryl, acyl, triorganosilyl or diorganoalkoxysilyl radical, $R^8$ represents hydrogen or the group $-[O(CHR^6)_n]_mOR^7$, or Y', n is 2, 3, 4, or 5 and m is a number of from 0 to 50.

Preferred examples of alkyl radicals represented by $R^6$ are the methyl and the ethyl radicals.

Examples of alkyl, alkenyl, cycloalkyl and aryl radicals specified heretofore for Y' and for hydrocarbon radicals $R^1$ are equally applicable to the alkyl, alkenyl, cycloalkyl and aryl radicals represented by $R^7$. Examples of acyl radicals represented by $R^7$ are the acetyl and the propionyl radicals. A preferred example of a triorganosilyl radical represented by $R^7$ is the trimethylsilyl radical. An example of a diorganoalkoxysilyl radical represented by $R^7$ is the dimethylethoxysilyl radical. In the group $-[O(CHR^6)_n]_mOR^7$, it is preferred that m have a maximum value of 25.

It is not essential that the phosphoric acid esters employed in the compositions of this invention be derived from orthophosphoric acid. They can also be derived from condensable phosphoric acids, such as diphosphoric acid.

Examples of suitable phosphoric acid esters are triethylphosphate, tri-n-butyl-phosphate, tris-(2-ethylhexyl)-phosphate, trioleylphosphate, tricresylphosphate, trixylenylphosphate, tris-(beta-hydroxyethyl)-phosphate, tris-(beta-butoxyethyl)-phosphate, tris-(beta-methoxyethyl)-phosphate, the tertiary ester of orthophosphoric acid and tetraethylene glycol monolauryl ether, the tertiary ester of ortho-phosphoric acid and diethylene glycol monolauryl ether and the secondary ester of orthophosphoric acid and tetraethylene glycol monolauryl ether.

Mixtures of various phosphoric acid esters may also be used in the compositions of this invention.

Phosphoric acid esters are preferably used in amount of from 0.1 to 20 percent by weight and more preferably from 0.5 to 5 percent by weight based on the total weight of the composition.

In addition to the diorganopolysiloxane containing condensable terminal groups, a silicon compound containing at least one nitrogen atom and having at least three hydrolyzable groups per molecule, a reinforcing filler and phosphoric acid esters, the compositions of this invention may include all the other substances which have been incorporated heretofore in compositions which can be stored under anhydrous conditions, but when exposed to atmospheric moisture at room temperature will cross-link to form elastomers. Examples of such substances are non-reinforcing fillers, pigments, soluble dyes, aromatics, organopolysiloxanes resins, including those consisting of $(CH_3)SiO_{\frac{1}{2}}$- and $SiO_{4/2}$-units, pure organic resins, polyvinyl chloride powder, corrosion inhibitors, oxidation inhibitors, heat stabilizers, solvents, agents which improve the adhesion on substrates of elastomers obtained from the prepared compositions, as well as a compound corresponding to the following formula:

$CH_3Si[O(CH_2)_2NH_2]_2(CH_2)_3O(CH_2)_2NH_2$.

Also materials which impart improved electrical properties, such as conductive lampblack, flame-retardant agents, photoprotective agents, condensation catalysts such as tin salts or carboxylic acid tin salts, for example, dibutyl tin dilaurate or amines, such as 3-ethoxypropylamine-1 or n-hexylamine, organopolysiloxane emollients, dimethylpolysiloxanes which are end-blocked with trimethylsiloxy groups, and polyglycols which can be etherified or esterified, including organosiloxane-oxyalkylene-blockcopolymers such as described in U.S. Pat. No. 3,677,996 may be incorporated in the composition of this invention.

One example of many polyglycols which may be employed is heptaethyleneglycol.

Non-reinforcing fillers, i.e., fillers having a surface area less than 50 m²/gm may be employed in the compositions of this invention. Examples of non-reinforcing fillers are quartz meal, diatomaceous earths, siliceous chalk, such as Neuberg chalk, calcium silicate, zirconium silicate and calcium carbonate, for example, in the form of ground chalk as well as calcinated aluminum silicate. These non-reinforcing fillers as well as the reinforcing fillers described above can be treated with, for example trimethylethoxysilane or stearic acid to impart hydrophobic properties thereto. These fillers may, for example, be treated in a ball mill.

Hydrous fillers such as asbestos and glass fibers, especially those having an average length of up to about 0.5 mm and/or organic fibers may be employed in the compositions of this invention.

Also, mixtures containing several different types of non-reinforcing fillers may be incorporated in these compositions.

Moreover, compounds having the general formula:

$R_a^9 NA_{3-a}$, wherein $R^9$ is hydrogen or is the same as $Y'$, A represents the group $—[(CHR^6)_nO]_{m'}R^7$ where $R^6$ and n are the same as above and $m'$ is a number from 2 to 50, may also be incorporated in the compositions of this invention. A suitable example of such a compound is oleyl-bis-(octaethyleneglycol)-amine.

The constituents of the compositions of this invention may be mixed in any desired sequence; however, it is preferred that they be mixed at room temperature and under anhydrous conditions.

Generally, atmospheric moisture is sufficient to cross-link the compositions of this invention. However, if desired, cross-linking can be carried out at temperatures above or below room temperatures, e.g., at 5° to 10° C. and/or by contacting the compositions with water which is in excess of that contained in atmospheric air.

The compositions of this invention are ideally suited for sealing fissures, including vertical fissures and similar cavities having widths of from about 10 mm to 50 mm, such as occur, for example in buildings which are constructed of lightweight building materials and prefabricated building components. These improved compositions may also be used in manufacturing insulating devices for electrical conductors and for coating surfaces, such as metal, synthetic and natural stone, woven and non-woven textiles and paper.

In the following examples the stability of the compositions was determined in accordance with DIN standard No. 52,454, while the modulus at 100 percent elongation as well as the elongation at break and the tensile strength of the elastomers prepared from the compositions of this invention were determined in accordance with DIN No. 53,504 Section S3A after a period of 14 days, during which the compositions were allowed to harden in 2 ± 0.1 mm thick strata on a smooth surface at 23° C. and at 50 percent relative humidity.

The crosslinking speed was determined by filling aluminum dishes which were 18 mm high and 24 mm in diameter with the compositions of this invention, under the conditions indicated by DIN No. 50,014 at 23° C. and 50 percent relative humidity and measuring the thickness of the crosslinked film with the aid of a sliding caliper at the time intervals indicated in Table II.

The rate of extrusion, i.e., the flowability of the compositions, was measured by extruding the composition under a pressure of 0.21 N/mm² through a 3 mm diameter nozzle and weighing the amount extruded within ten seconds.

EXAMPLE 1

Forty (40) gm of a hydroxyl terminated dimethylpolysiloxane having a viscosity at 300,000 mPa s at 25° C. are mixed with 60 gm of a hydroxyl terminated dimethylpolysiloxane having a viscosity of 75,000 mPa s at 25° C., 80 gm of a trimethylsiloxy endblocked dimethylpolysiloxane having a viscosity of 100 mPa s at 25° C., and 8 gm of trioleylphosphate. To the mixture thus prepared is added 160 gm of calcium carbonate in the form of ground chalk, then 16 gm of silicon dioxide which had been pyrogenically obtained in the gaseous phase which had a surface area of 150 m²/gm and finally a mixture consisting of 20 gm of methyltris-(sec.-butylamino)-silane and 0.4 gm of 3-ethoxypropylamine-1.

The resultant composition is placed in sealed tubes and stored for 24 hours at room temperature. The samples are then removed from the tubes and subjected to the tests described above.

EXAMPLE 2

The process described in Example 1 is repeated, except that 8 gm of a tertiary ester of orthophosphoric acid and tetraethylene glycol monolauryl ether are substituted for the trioleylphosphate.

EXAMPLE 3

The process described in Example 1 is repeated, except that 6 gm of a tertiary ester of orthophosphoric acid and diethylene glycol monolauryl ether and 2 gm of heptaethyleneglycol are substituted for the trioleylphosphate.

EXAMPLE 4

The process described in Example 1 is repeated, except that 8 gm of a secondary ester of orthophosphoric acid and tetraethylene glycol monolauryl ether are substituted for the trioleylphosphate.

COMPARISON EXAMPLE $V_1$

The process described in Example 1 is repeated, except that 8 gm of a co-polymer consisting of 40 percent by weight of ethylene oxide-derived units and 60 percent by weight of propylene oxide-derived units having an average molecular weight of 3400 are substituted for the trioleylphosphate.

COMPARISON EXAMPLE $V_2$

The process described in Example 1 is repeated, except that the phosphoric acid ester is omitted.

Table I shows the properties of the compositions and elastomers prepared in accordance with Examples 1 through 4 and Comparison Examples $V_1$ and $V_2$.

TABLE 1

| Example | Stability | Extrusion Rate gm | Modulus at 100% Elongation N/mm² | Elongation at break % |
|---------|-----------|-------------------|----------------------------------|-----------------------|
| 1 | Stable | 6.3 | 0.18 | 510 |
| 2 | Stable | 6.0 | 0.18 | 520 |
| 3 | Stable | 5.5 | 0.22 | 560 |
| 4 | Stable | 6.0 | 0.18 | 510 |
| $V_1$ | Stable | 4.0 | 0.38 | 550 |
| $V_2$ | Unstable | — | 0.58 | 380 |

EXAMPLE 5

One hundred twenty (120) gm of a hydroxyl terminated dimethylpolysiloxane having a viscosity of 78,000 mPa at 25° C. are mixed with 80 gm of a trimethylsiloxy endblocked dimethylpolysiloxane having a viscosity of 35 mPa at 25° C., 8 gm of a secondary ester of orthophosphoric acid and tetraethylene glycol monolauryl ether and 28 gm of a mixture consisting of 1 mol of methyltris-(cyclohexylamino)-silane and 2 mol of methyltris-(methylethylketoximo)-silane. To the mixture thus prepared is added first 180 gm of ground stearic acid-coated chalk, then 16 gm of silicon dioxide which was pyrogenically obtained in the gaseous phase, having a surface area of 150 m²/gm and, thereafter 0.4 gm of dibutyl tin dilaurate.

The resultant composition is placed in sealed tubes and stored for 24 hours at room temperature. The composition is then removed from the tubes and subjected to the tests described above.

COMPARISON EXAMPLE V₃

The process described in Example 5 is repeated, except that 8 gm of an organosiloxane-oxyalkylene-block-copolymer corresponding to the following formula:

$$CH_3COO(CH_2CH_2O)_6(CH_2)_3[Si(CH_3)_2O]_1-$$
$$-Si(CH_3)_2(CH_2)_3(OCH_2CH_2)_6OOCCH_3$$

are substituted for the secondary ester of phosphoric acid.

COMPARISON EXAMPLE V₄

The process described in Example 5 is repeated, except that the phosphoric acid ester is omitted.

Table II shows the properties of the elastomers prepared in accordance with Example 5 and Comparison Examples V₃ and V₄.

TABLE II

| Example | Stability | Thickness of Crosslinked film after - | | | | Modulus 100% Elongation N/mm² | Tensile Strength N/mm² | Elongation at break % |
| --- | --- | --- | --- | --- | --- | --- | --- | --- |
| | | 3 days mm | 6 days mm | 10 days mm | 13 days mm | | | |
| 5 | Stable | 3.5 | 5.0 | 6.2 | 7.2 | 0.15 | 1.03 | 640 |
| V₃ | Stable | 2.9 | 4.0 | 5.0 | 6.0 | 0.25 | 0.85 | 540 |
| V₄ | Unstable | 2.6 | 3.6 | 4.4 | 5.3 | 0.30 | 0.71 | 440 |

What is claimed is:

1. A composition which can be stored under anhydrous conditions but when exposed to atmospheric moisture cures at room temperature to an elastomer comprising a diorganopolysiloxane having reactive terminal groups, a silicon compound having at least one nitrogen atom and at least three hydrolyzable groups per molecule, a reinforcing filler and a phosphoric acid ester.

2. The composition of claim 1, wherein the phosphoric acid ester is present in an amount of from 0.1 to 20 percent by weight based on the total weight of the composition.

3. The composition of claim 1, wherein the phosphoric acid ester is trioleylphosphate.

4. The composition of claim 1 wherein the phosphoric acid ester is a tertiary ester of orthophosphoric acid and diethylene glycol monolauryl ether.

5. A method for preparing an elastomer which comprises exposing the composition of claim 1 to atmospheric moisture at room temperature.

6. An elastomer obtained from the method of claim 5.